(12) United States Patent
Dwyer et al.

(10) Patent No.: US 12,529,320 B1
(45) Date of Patent: Jan. 20, 2026

(54) PARTIAL SHEAR TUBE Y-WEAVE TRAILING EDGE FOR A CMC VANE AND METHOD THEREFOR

(71) Applicant: RTX CORPORATION, Farmington, CT (US)

(72) Inventors: John A. Dwyer, Colchester, CT (US); Brian Cronin, Manchester, CT (US); Brittney L. Antous, Sandy Hook, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/829,998

(22) Filed: Sep. 10, 2024

(51) Int. Cl.
*F01D 5/28* (2006.01)

(52) U.S. Cl.
CPC ............ *F01D 5/282* (2013.01); *F01D 5/284* (2013.01); *F05D 2230/20* (2013.01); *F05D 2300/6033* (2013.01); *F05D 2300/6034* (2013.01)

(58) Field of Classification Search
CPC .................. F01D 5/282; F01D 5/284
See application file for complete search history.

(56) References Cited

U.S. PATENT DOCUMENTS

| | | | |
|---|---|---|---|
| 7,258,530 B2 * | 8/2007 | Morrison | F01D 5/284 416/232 |
| 9,664,053 B2 | 5/2017 | Marshall et al. | |
| 10,724,387 B2 | 7/2020 | Farrar et al. | |
| 10,975,706 B2 * | 4/2021 | Farrar | F01D 9/042 |
| 11,261,741 B2 | 3/2022 | Kennedy et al. | |
| 11,414,355 B2 | 8/2022 | Sheedy et al. | |
| 11,591,921 B1 * | 2/2023 | Whittle | F01D 9/042 |
| 11,725,522 B2 | 8/2023 | Banhos et al. | |
| 11,905,851 B2 | 2/2024 | Kim et al. | |
| 11,920,495 B1 | 3/2024 | Campbell | |

* cited by examiner

*Primary Examiner* — Michael L Sehn
(74) *Attorney, Agent, or Firm* — Christopher B. Kilner; MILLEN, WHITE, ZELANO & BRANIGAN

(57) ABSTRACT

A ceramic matrix composite (CMC) vane or layup therefor includes first and second platforms, and an airfoil portion extending therebetween. The airfoil portion includes a first portion of a shear tube extending relatively orthogonal to the first and second platforms, wherein the first portion of the shear tube extends through the first and second platforms, and wherein the first portion of the shear tube defines a leading edge and a hollow core of the airfoil portion. A second portion of the shear tube is connected to the first portion of shear tube and extends relatively orthogonal to the first and second platforms, wherein the second portion of the shear tube also extends through the first and second platforms, and wherein the second portion of the shear tube includes a Y-weave ply and a trailing edge noodle that define a trailing edge of the airfoil portion.

15 Claims, 9 Drawing Sheets

PARTIAL SHEAR TUBE Y-WEAVE TRAILING EDGE FOR A CMC VANE AND METHOD THEREFOR

FIELD OF THE INVENTION

The subject matter disclosed herein relates to ceramic matrix composite (CMC) vanes and, in particular, to a partial shear tube Y-weave trailing edge for a CMC vane and a fabric layup method therefor.

BACKGROUND OF THE INVENTION

CMC materials using a fabric layup may be used for producing turbine stator vanes. However, a trailing edge of a CMC vane has limitations in terms of radius. This is due to the minimum bend radius of CMC materials, i.e., the radius as which the fabric layup material breaks and frays. Thus, the minimum bend radius of the ply of fabric increases the size of the trailing edge of vanes, generally much larger than that of their metal vane counterparts.

Ideally, the trailing edge of the vane part should be smaller to provide better aerodynamics for the vane. Alternative methods that shrink the trailing edge radius are therefore desirable. CMC vanes are generally laid up with an overwrap ply of fabric that must comply with the minimum bend radius limitations of the material.

A recent method to reduce the trailing edge radius has been the introduction of a Y-weave ply of fabric. A Y-weave ply is essentially two plies of preform material that are woven together in part, resulting in a thicker consolidated ply and two free wings of single ply. This causes a "Y"-shaped appearance that gives it the name. A Y-weave ply has been employed to form a trailing edge for CMC airfoils, wherein the consolidated ply of the Y-weave forms the trailing edge so as to reduce the trailing edge radius below the typical bend radius of a ply. Examples of this technique may be found in U.S. Pat. Nos. 10,724,387, 11,414,355, 11,905,851, and 11,929,495.

However, when a Y-weave ply has been used in a layup for a stator vane that is supported between inner and outer platforms, the Y-weave ply has been separate from the shear tube passing through the platform and it has been found that an interface of the trailing edge and the platform requires an extra machining step to provide proper aerodynamics at the interface.

The above information disclosed in this Background section is only for understanding of the background of the inventive concepts and, therefore, it may contain information that does not constitute prior art.

SUMMARY OF THE INVENTION

The present disclosure is directed, in a first aspect, to a CMC vane that includes a first platform, a second platform, and an airfoil portion extending between the first platform and the second platform. The airfoil portion includes a first portion of a shear tube extending relatively orthogonal to the first platform and the second platform, wherein the first portion of the shear tube extends through the first platform and through the second platform, and wherein the first portion of the shear tube defines a leading edge and a hollow core of the airfoil portion. The airfoil portion also includes a second portion of the shear tube connected to the first portion of shear tube and extending relatively orthogonal to the first platform and the second platform, wherein the second portion of the shear tube also extends through the first platform and through the second platform, and wherein the second portion of the shear tube includes a Y-weave ply and a trailing edge noodle that define a trailing edge of the airfoil portion.

In an embodiment of the CMC vane, the Y-weave ply may include a consolidated ply and two wing plies, and the wing plies may include cuts relatively orthogonal to the first platform and the second platform adjacent a forward end of the trailing edge noodle such that portions of the Y-weave ply behind the cuts and adjacent the trailing edge noodle extend through the first platform and the second platform.

In another embodiment of the CMC vane, the wing plies forward of the cuts may be blended from a surface of the airfoil portion into a surface of the first platform and a surface of the second platform.

In a further embodiment, the CMC vane may include a first cap ply blending a surface of the airfoil portion behind the cuts into a surface of the first platform and a second cap ply blending a surface of the airfoil portion behind the cuts into a surface of the second platform.

In yet another embodiment of the CMC vane, each of the first cap ply and second cap ply may include a notch for passage of the consolidated ply of the Y-weave ply.

In an embodiment of the CMC vane, the consolidated ply of the Y-weave ply may be trimmed to have a curvature matching a blending curvature of the first and second cap ply prior to densification.

In another embodiment of the CMC vane, the consolidated ply of the Y-weave ply may be trimmed to form the trailing edge of the airfoil portion prior to densification.

In a further embodiment of the CMC vane, the consolidated ply of the Y-weave ply may extend further rearward while passing through the first and second platforms than portions of the consolidated ply forming the trailing edge of the airfoil portion.

In yet another embodiment of the CMC vane, the wing plies wrap may around the leading edge of the airfoil portion.

In an embodiment of the CMC vane, the Y-weave ply and the first and second cap ply may form the overwrap plies of the airfoil portion and adjacent surfaces of the first and second platforms.

The present disclosure is directed, in a second aspect, to a method of forming a CMC vane. The method includes forming an airfoil portion having a shear tube by applying layers of fabric ply to a mandrel to form a first portion of the shear tube, wherein the first portion of the shear tube defines a leading edge portion and a hollow core of the airfoil portion, and forming a trailing edge noodle on the first portion of shear tube opposite the leading edge portion and overwrapping a Y-weave ply to form a second portion of the shear tube defining a trailing edge portion of the airfoil portion. The method further includes forming a first platform at a first end of the shear tube with first donut plies such that the shear tube extends through the first platform, forming a second platform at a second end of the shear tube with second donut plies such that the shear tube extends through the second platform, and applying an overwrap ply to surfaces of at least a portion of each of the first platform, the second platform, and airfoil portion CMC vane.

In an embodiment of the method, the Y-weave ply may include a consolidated ply and two wing plies, and the method may further include cutting the wing plies relatively orthogonal to the first platform and the second platform adjacent a forward end of the trailing edge noodle such that portions of the Y-weave ply behind the cuts and adjacent the trailing edge noodle extend through the first platform and the second platform.

In an embodiment, the method may further include blending the wing plies forward of the cuts from a surface of the airfoil portion into a surface of the first platform and a surface of the second platform.

In another embodiment, the method may further include blending a surface of the airfoil portion behind the cuts into a surface of the first platform with a first cap ply, and blending a surface of the airfoil portion behind the cuts into a surface of the second platform with a second cap ply.

In a further embodiment, the method may include notching each of the first cap ply and second cap ply for passage of the consolidated ply of the Y-weave ply.

In yet another embodiment, the method may further include trimming the consolidated ply of the Y-weave ply to have a curvature matching a blending curvature of the first and second cap ply prior to densification.

In an embodiment, the method may further include trimming the consolidated ply of the Y-weave ply to form the trailing edge of the airfoil portion prior to densification.

The present disclosure is directed, in a third aspect, to a CMC vane layup or preform. The CMC vane layup includes a first platform layup formed of a plurality of first donut plies, a second platform layup formed of a plurality of second donut plies, and an airfoil portion layup extending between the first platform and the second platform. The airfoil portion layup includes a first portion of a shear tube formed of fabric plies wrapped around a mandrel, the first portion of a shear tube extending relatively orthogonal to the first platform layup and the second platform layup, wherein the first portion of the shear tube extends through the first platform layup and the second platform layup, and wherein the first portion of the shear tube defines leading edge. The airfoil portion layup also includes a second portion of a shear tube connected to the first portion of shear tube and extending relatively orthogonal to the first platform layup and the second platform layup, wherein the second portion of the shear tube also extends through the first platform layup and the second platform layup, wherein the second portion of the shear tube includes a Y-weave ply overwrap and a trailing edge noodle that define a trailing edge of the airfoil portion layup, wherein the Y-weave ply includes a consolidated ply and two wing plies, and wherein the wing plies include cuts relatively orthogonal to the first platform layup and the second platform layup adjacent a forward end of the trailing edge noodle such that portions of the Y-weave ply behind the cuts and adjacent the trailing edge noodle extend through the first platform layup and the second platform layup.

In an embodiment of the CMC vane layup, the wing plies forward of the cuts may be blended from a surface of the airfoil portion layup into a surface of the first platform layup and a surface of the second platform layup, and the CMC vane layup may further include a first cap ply blending a surface of the airfoil portion layup behind the cuts into a surface of the first platform layup and a second cap ply blending a surface of the airfoil portion layup behind the cuts into a surface of the second platform layup.

In another embodiment of the CMC vane layup, each of the first cap ply and second cap ply may include a notch for passage of the consolidated ply of the Y-weave ply, the consolidated ply of the Y-weave ply may be trimmed to have a curvature matching a blending curvature of the first and second cap ply, and the wing plies may wrap around the leading edge.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

The embodiments of the present disclosure can comprise, consist of, and consist essentially of the features and/or steps described herein, as well as any of the additional or optional ingredients, components, steps, or limitations described herein or would otherwise be appreciated by one of skill in the art.

The present disclosure is directed to a ceramic matrix composite (CMC) vane, and in particular to a fabric layup (i.e., preform) of the CMC vane that eliminates a post-densification machining step to the trailing edge.

Special tooling, as is known in the art, may be used to guide the layup of the fabric plies to create a preform for the CMC vane. Typically, woven or braided fabric will be wrapped around a mandrel to create a general shape of the airfoil and airfoil cavity that forms the shear tube. The shear tube provides structure for the airfoil, and the rest of the preform for the vane component is typically built outwards from the shear tube. The exact order of operations typically needs to be determined during a manufacturing trial, but technicians typically use tools/tooling made from plastic or metal to layup the plies to create the platforms and trailing edge of the preform, with final overwrap and/or cap plies being applied last. The completed preform may then be put into specialized tooling to hold its shape during the densification/infiltration processes used to complete manufacture of the CMC vane.

Figure 1:
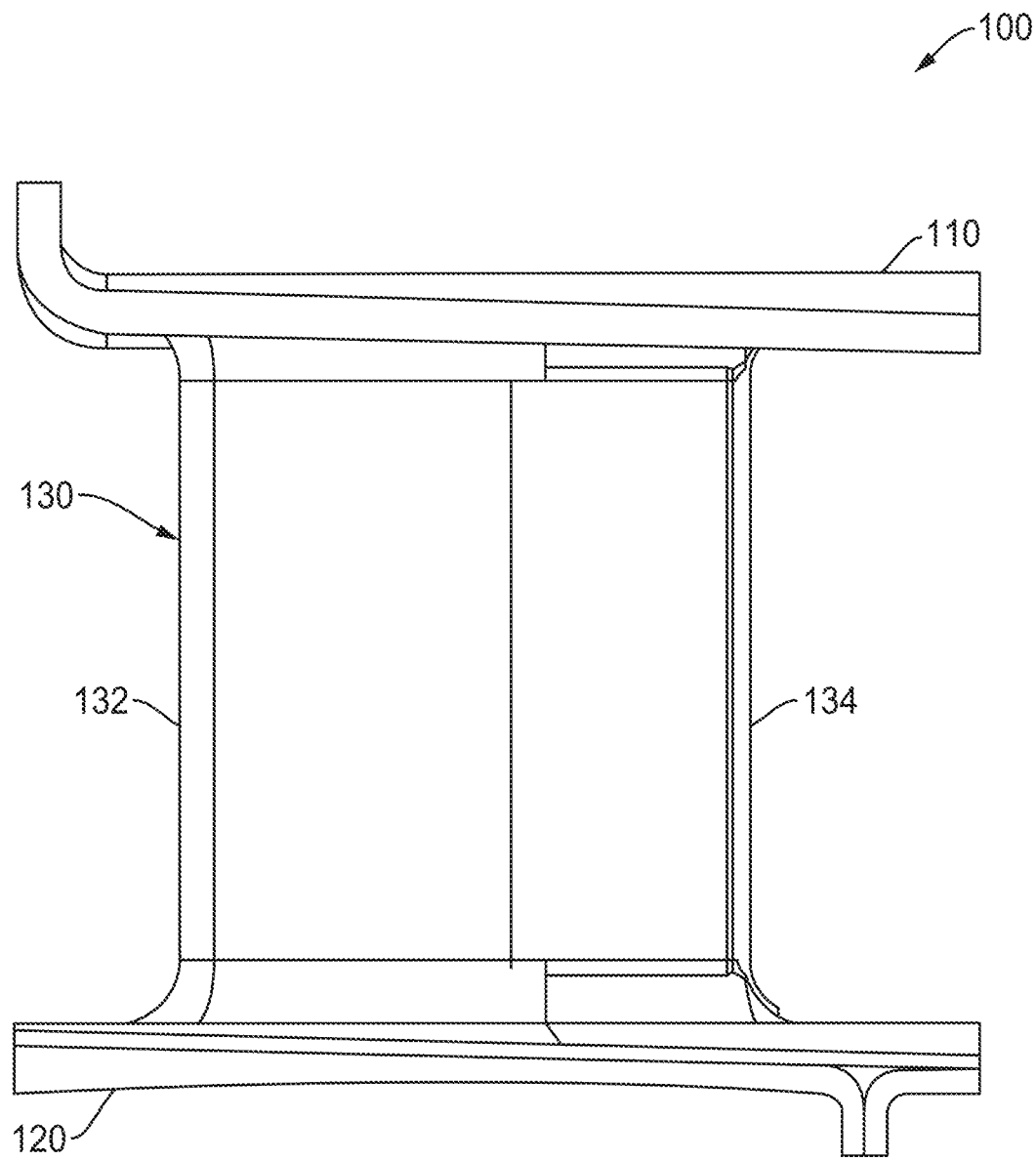
FIG. 1 is a side elevation view of an example fabric layup for a CMC stator vane in accordance with the present disclosure.
Figure 2:
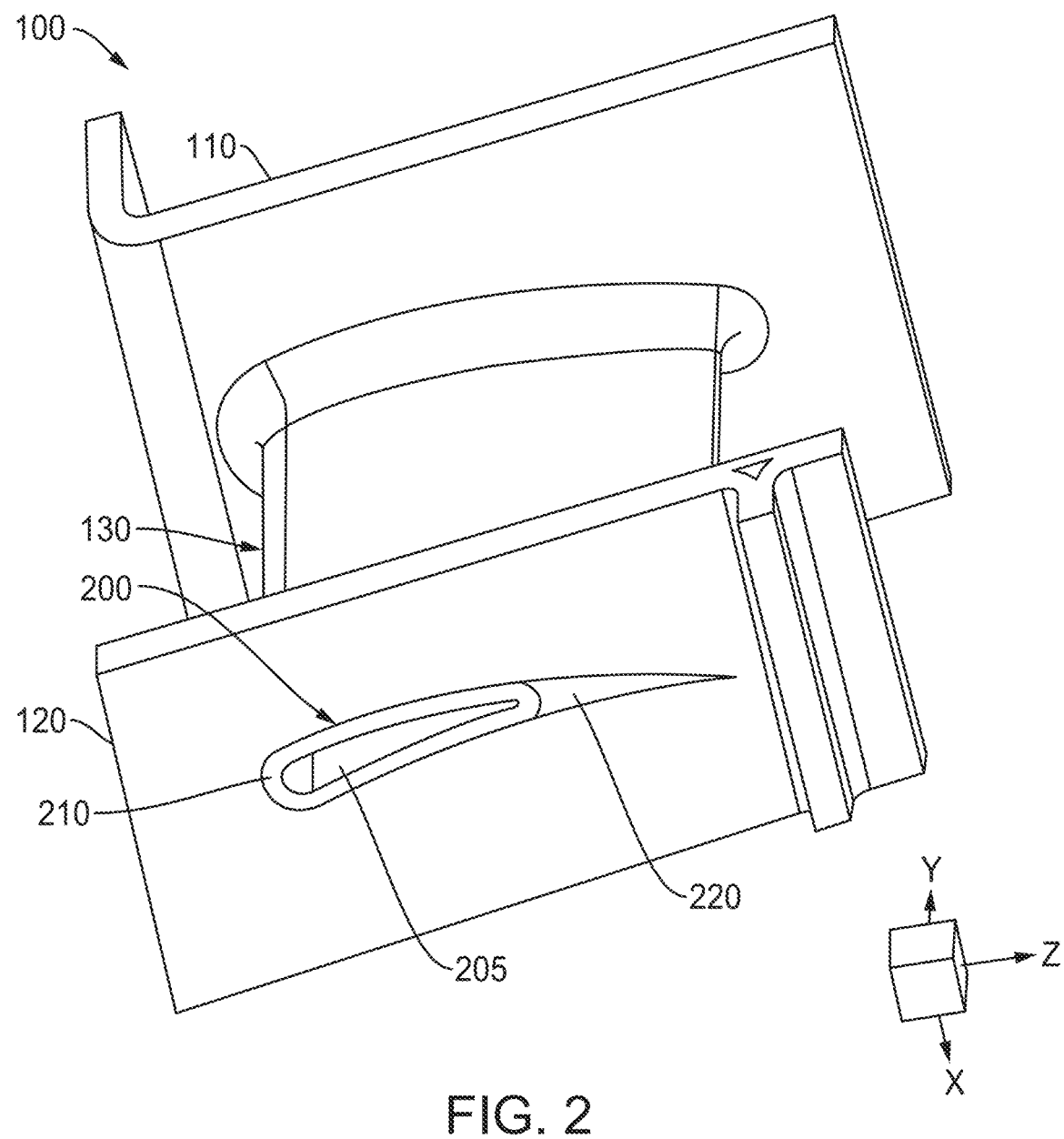
FIG. 2 is a first orthogonal view of the example fabric layup for a CMC stator vane in accordance with the present disclosure.
Figure 3:
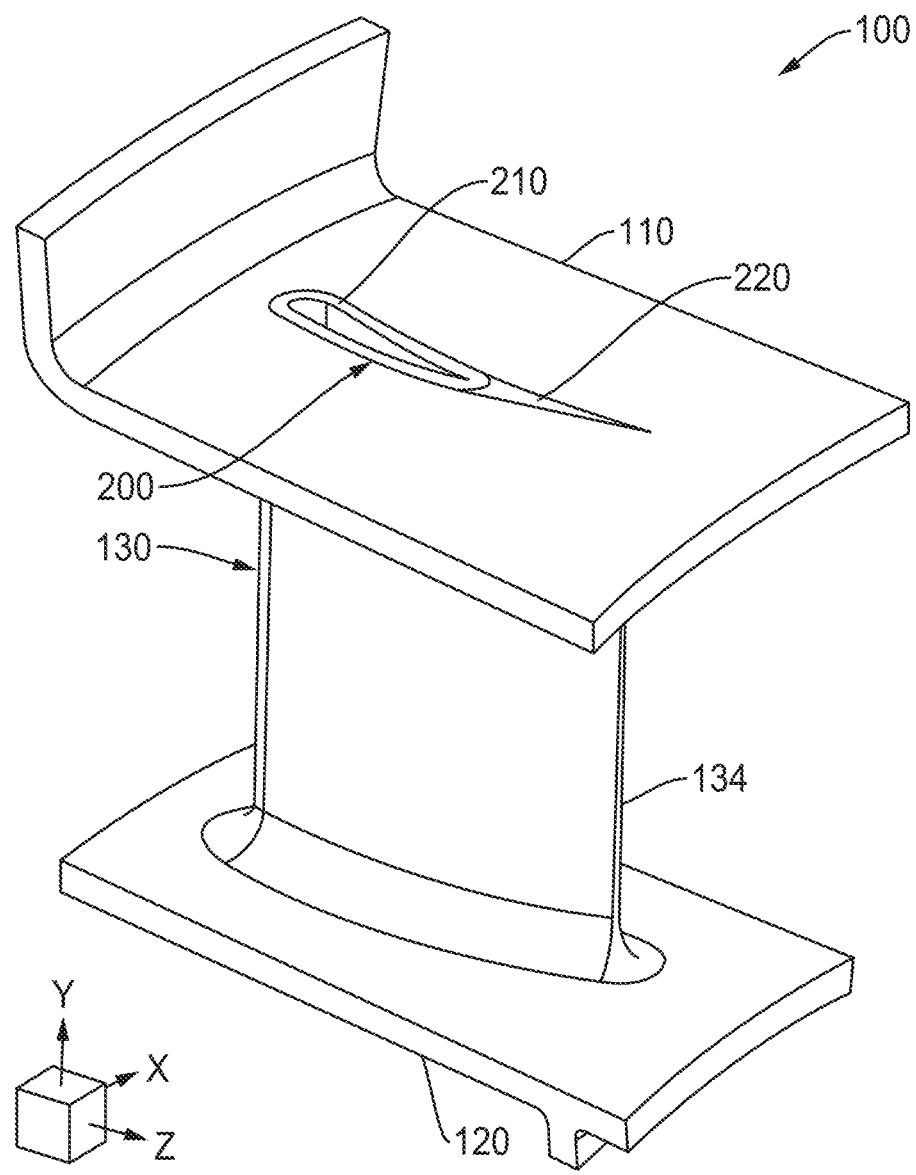
FIG. 3 is a second orthogonal view of the example fabric layup for a CMC stator vane in accordance with the present disclosure.

Referring to FIGS. 1-3, a preform or layup of a CMC vane 100 includes a first platform 110, a second platform 120, and an airfoil portion 130 extending between the first platform 110 and the second platform 120. The airfoil portion 130 includes a first portion 210 of a shear tube 200 extending relatively orthogonal to the first platform 110 and the second platform 120. This first portion 210 of the shear tube 200 extends through the first platform 110 as shown in FIG. 3 and through the second platform 120 as shown in FIG. 2. The first portion 210 of the shear tube 200 defines a leading edge 132 and a hollow core 205 of the airfoil portion 130.

Referring to FIGS. 2 and 3, the shear tube 200 further includes a second portion 220 connected to the first portion 210 of the shear tube 200. The second portion 220 extends relatively orthogonal to the first platform 110 and the second platform 120, and this second portion 220 of the shear tube 200 also extends through the first platform 110 and through the second platform 120. The second portion 220 of the shear tube 200 includes a Y-weave ply 224 (see FIGS. 4 and 5A) and trailing edge noodle 222 (see FIG. 4) that define a trailing edge 134 of the airfoil portion 130.

Figure 4:
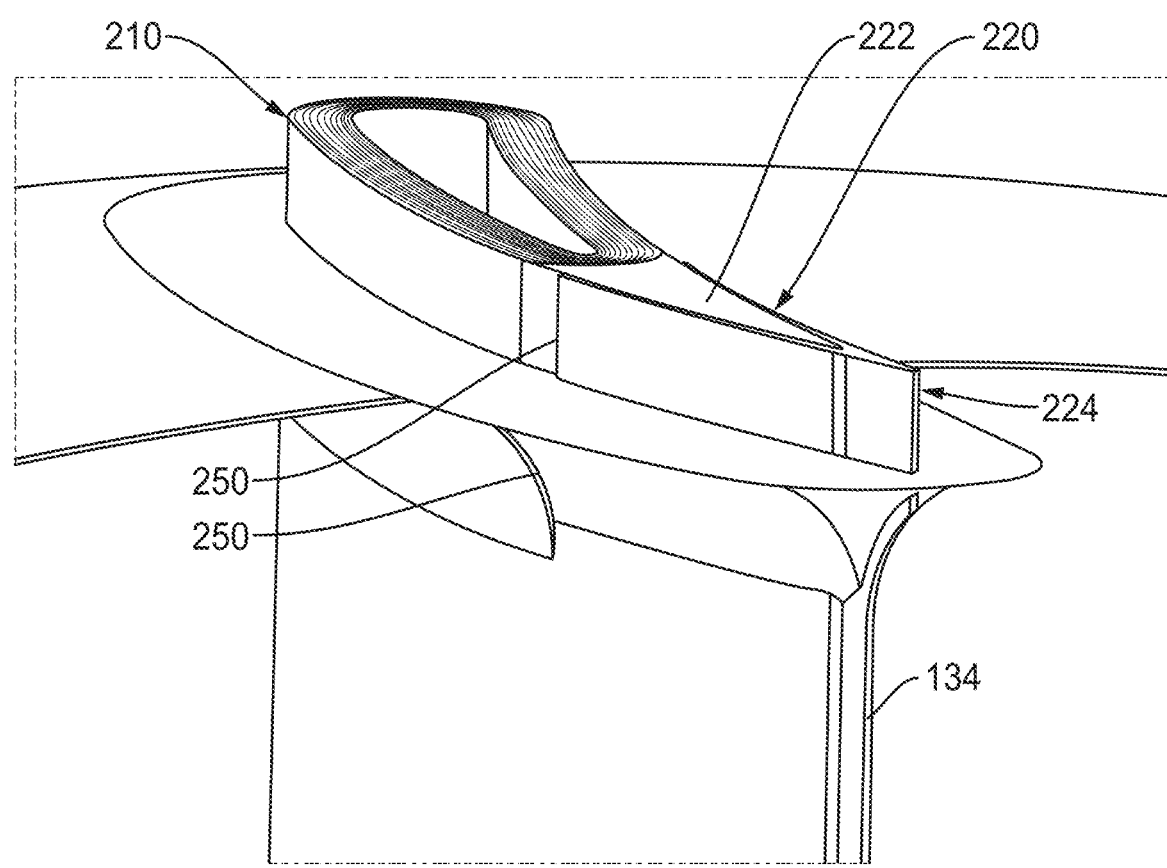
FIG. 4 is a partial view of an embodiment of a shear tube in accordance with the present disclosure.
Figure 5A:
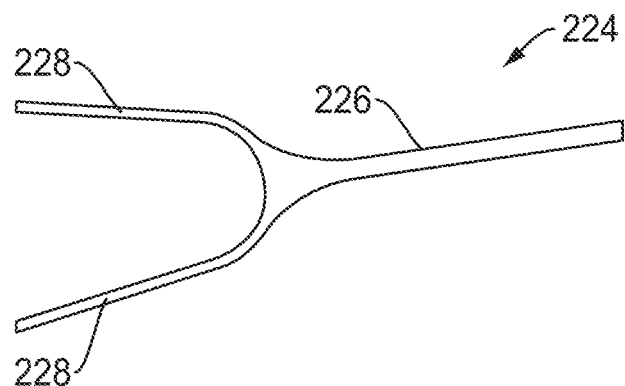
FIG. 5A is a schematic cross-sectional view of a Y-weave ply usable in the present disclosure.
Figure 5B:
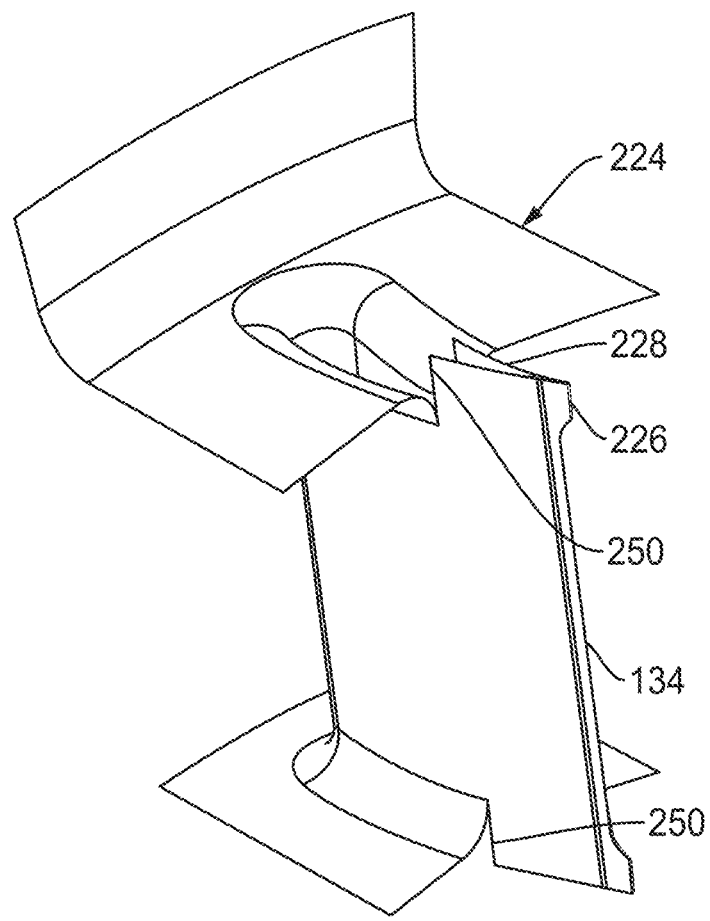
FIG. 5B is an orthogonal view of an embodiment of the Y-weave ply in a configuration in accordance with the present disclosure.

As illustrated in FIG. 5A, the Y-weave ply 224 includes a consolidated ply 226 and two wing plies 228. Referring to FIGS. 4 and 5B, the wing plies 228 include cuts 250 relatively orthogonal to the first platform 110 and the second platform 120 adjacent a forward end of the trailing edge noodle 222 such that portions of the Y-weave ply 224 behind the cuts 250 and adjacent the trailing edge noodle 222 extend through the first platform 110 and the second platform 120 (which are omitted for clarity in FIG. 4) so as to provide an outer boundary around the trailing edge noodle 222 and form the second portion 220 of the shear tube 200.

Figure 6:
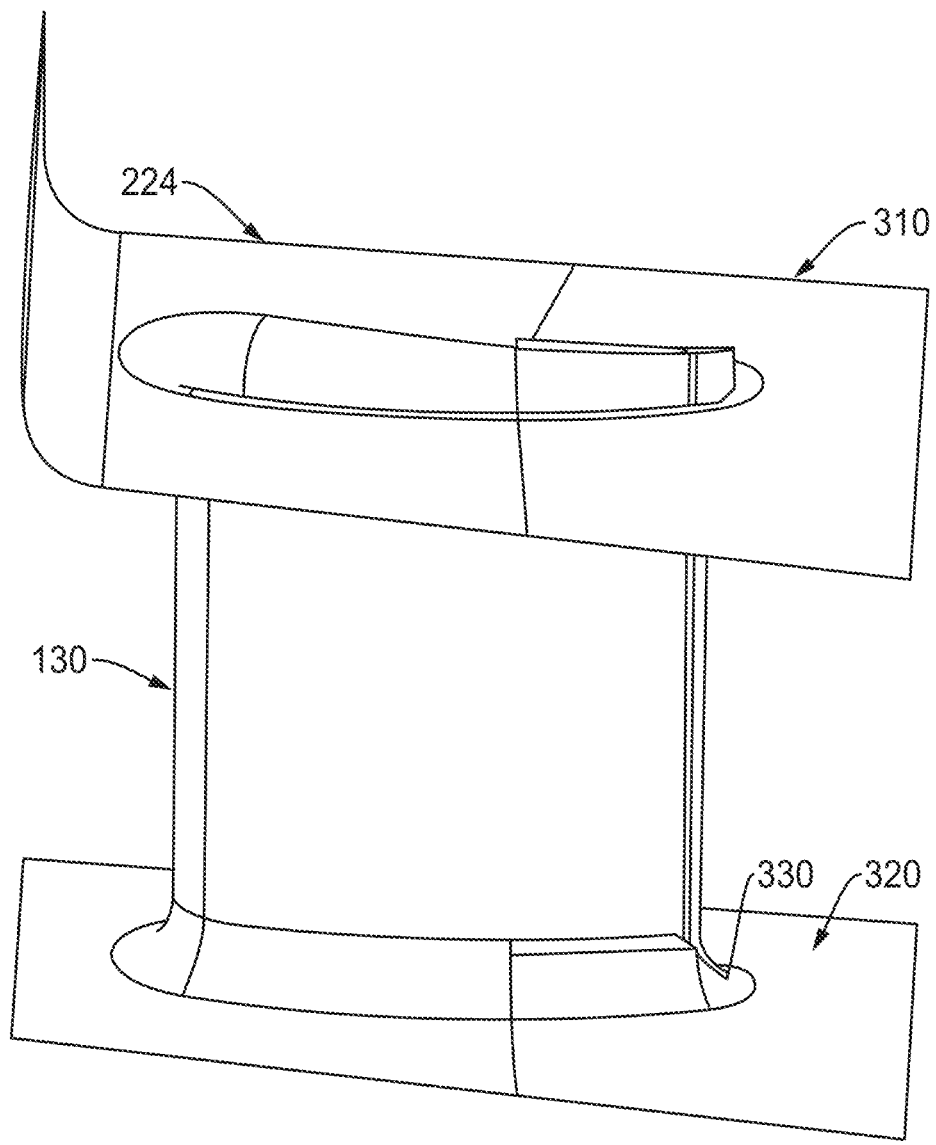
FIG. 6 is an orthogonal view of an embodiment of an overwrap of the Y-weave ply and cap plies in a configuration in accordance with the present disclosure.
Figure 7:
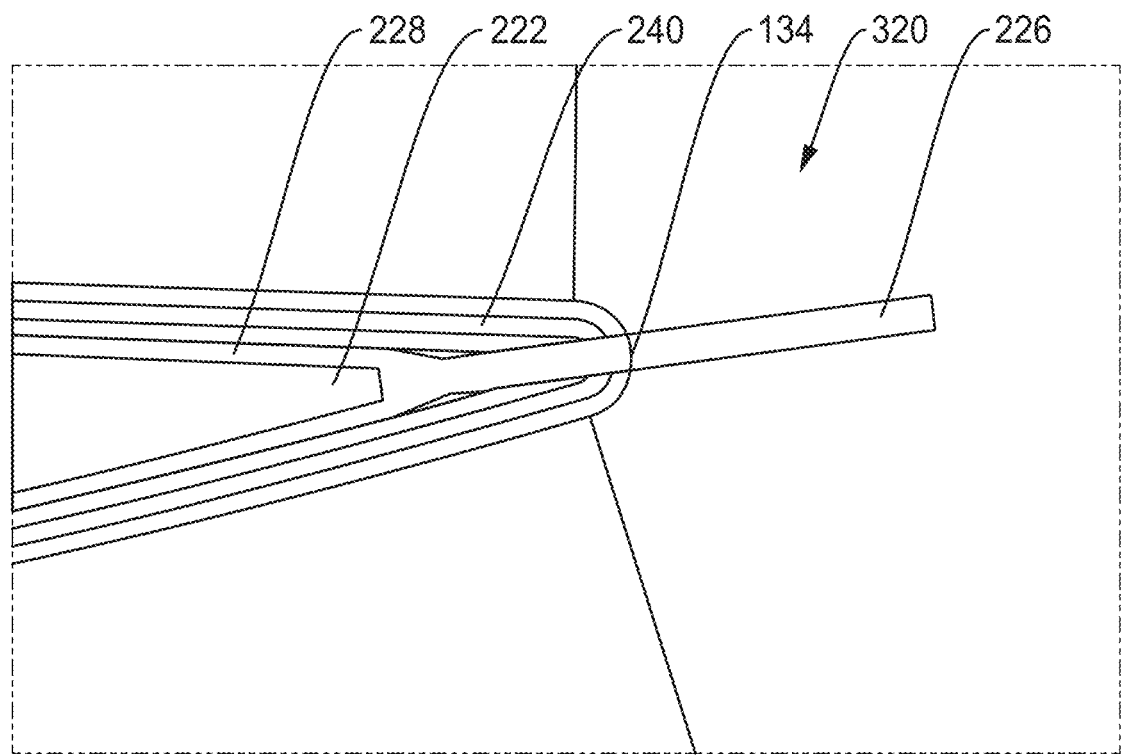
FIG. 7 is a detail cross-sectional view of the trailing edge adjacent a cap ply in accordance with the present disclosure.

Referring to FIGS. 5B and 6, the wing plies 228 of Y-weave ply 224 positioned forward of the cuts 250 may be blended from a surface of the airfoil portion 130 into a surface of the first platform 110 and a surface of the second platform 120. Referring to FIG. 6, a first cap ply 310 may be used to blend a surface of the airfoil portion 130 behind the cuts 250 into a surface of the first platform 110 and a second cap ply 320 may be used to blend a surface of the airfoil portion 130 behind the cuts 250 into a surface of the second platform 120. Referring to FIG. 7, the airfoil portion 130 near trailing edge 134 may include additional partial overwrap plies 240 over the wing plies 228 and consolidated ply 226 of Y-weave ply 224.

Figure 8:
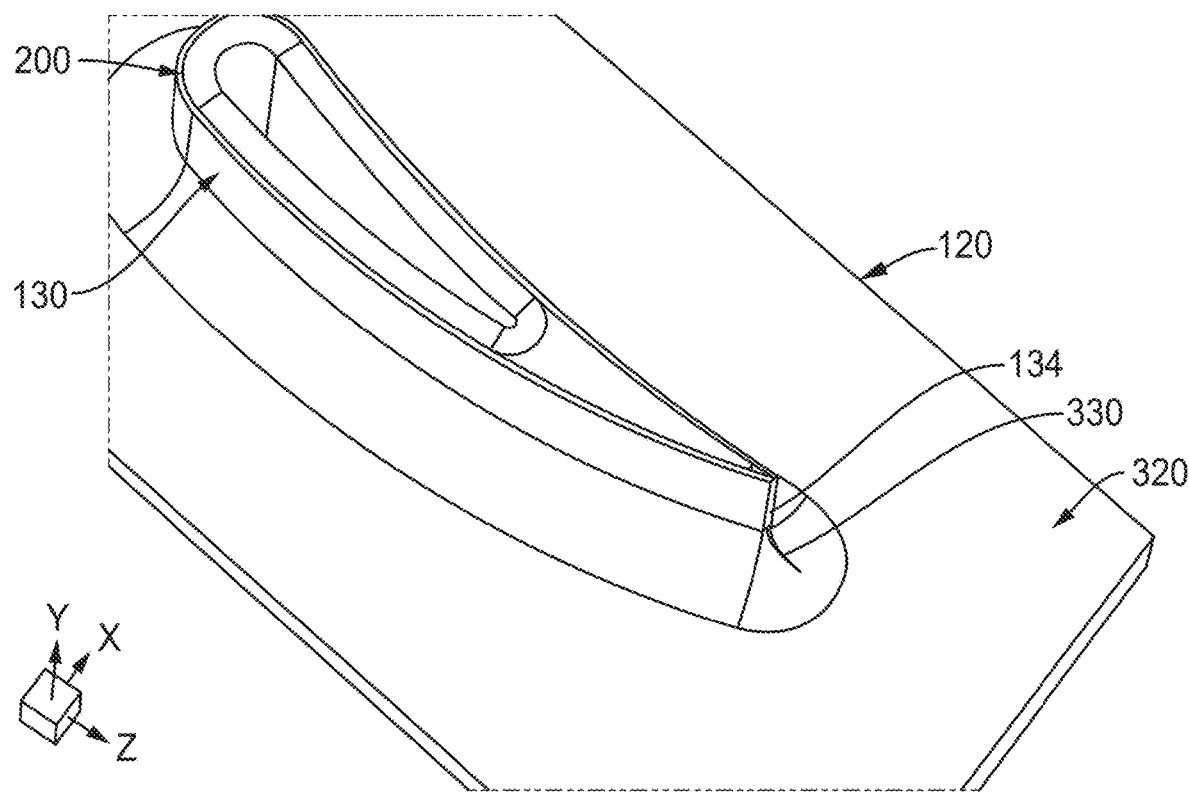
FIG. 8 is an orthogonal cross-sectional view of the trailing edge adjacent a notched cap ply in accordance with the present disclosure.

Referring to FIGS. 6-8, each of the first cap ply 310 and second cap ply 320 may include a notch 330 for passage of the consolidated ply 226 of the Y-weave ply 224. The consolidated ply 226 of the Y-weave ply 224 may be trimmed to have a curvature matching a blending curvature of the first cap ply 310 and second cap ply 320 prior to densification. The consolidated ply 226 of the Y-weave ply 224 may also be trimmed to form the trailing edge 134 of the airfoil portion 130 prior to densification. The consolidated ply 226 may be cut in any suitable manner, such as with a blade or a laser. By performing this trimming on the fabric layup to refine the shape of the CMC vane 100, post-densification machining steps to shape the trailing edge 134 and the interface of the trailing edge 134 where it meets the platforms 110 and 120 may be avoided to save both the time and cost of the omitted machining steps.

Moreover, the consolidated ply 226 of the Y-weave ply 224 may extend further rearward while passing through the first platform 110 and through the second platform 120 than the portions of the consolidated ply 226 forming the trailing edge 134 of the airfoil portion 130. This further extension of the consolidated ply 226 making up the second portion 220 of the shear tube 200 allows the consolidated ply 226 to be trimmed to match the radius where the trailing edge portion 134 meets the first and second platforms 110 and 120 of the CMC vane 100 for proper aerodynamics, without the need for additional machining after densification/infiltration.

As illustrated in FIGS. 5B and 6, the wing plies 228 of the Y-weave ply 224 may wrap around the leading edge 132 of the airfoil portion 130 as part of an overwrap of the layup for CMC vane 100. Indeed, as shown in the embodiment of FIG. 6, the Y-weave ply 224 and the first cap ply 310 and second cap ply 320 may form the overwrap plies of the airfoil portion 130 and adjacent surfaces of the first and second platforms 110 and 120, respectively.

Figure 9:
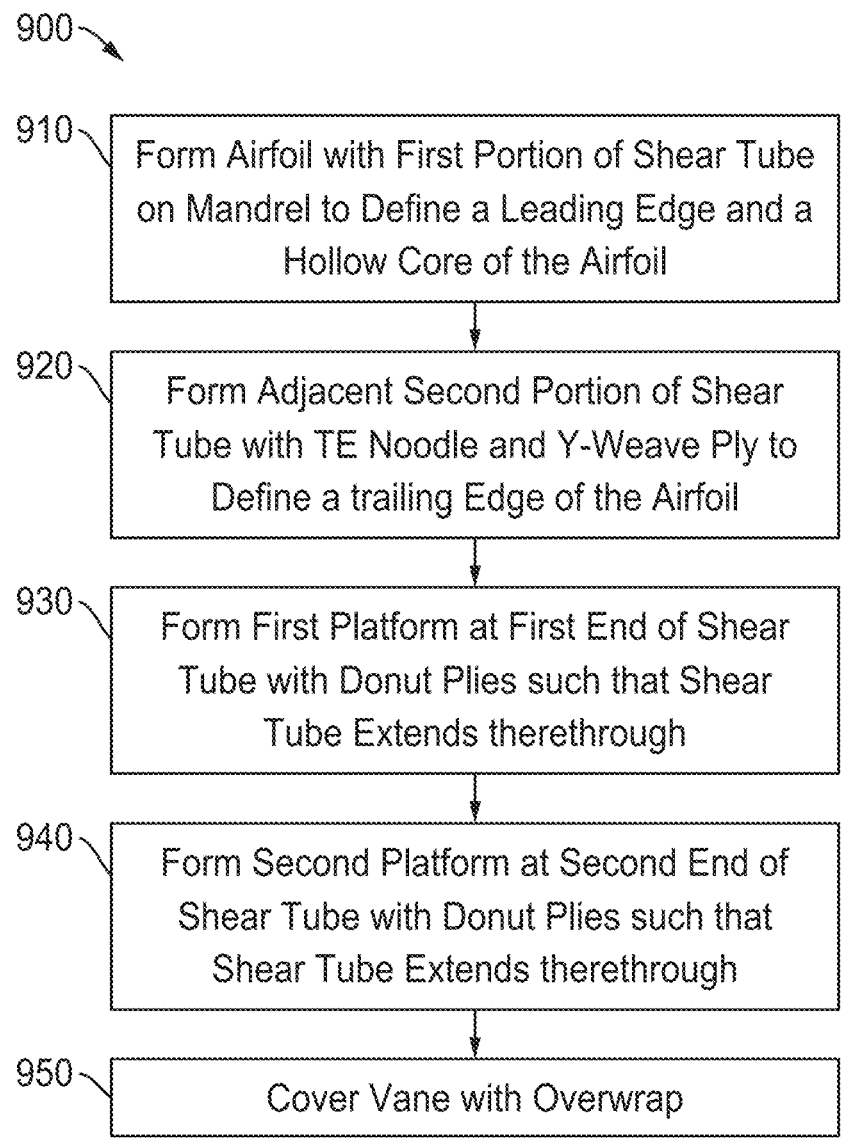
FIG. 9 is a flow diagram of a method in accordance with the present disclosure.

One or more embodiments of the present disclosure further relate to a method 900 of forming a CMC vane 100. Referring to FIG. 9, in an embodiment, the method 900 includes a step 910 of forming an airfoil portion 130 having a shear tube 200 by applying layers of fabric ply to a mandrel to form a first portion 210 of the shear tube 200, wherein the first portion 210 of the shear tube 200 defines a leading edge portion 132 and a hollow core 205 of the airfoil portion 130.

Method 900 further includes a step 920 of forming an adjacent second portion 220 of the shear tube 200 with a trailing edge noodle 222 overwrapped with a Y-weave ply 224 to define a trailing edge portion 134 of the airfoil portion 130.

In a step 930, a first platform 110 is formed at a first end of the shear tube 200 with first donut plies such that the shear tube 200 extends through the first platform 110. In a step 940, a second platform 120 is formed at a second end of the shear tube 200 with second donut plies such that the shear tube 200 extends through the second platform 120.

In a step 950, overwrap and/or cap plies (e.g., first cap ply 310 and/or second cap ply 320) are applied to surfaces of at least a portion of each of the first platform 110, the second platform 120, and airfoil portion 130 of CMC vane 100.

In various embodiments of the method 900, the Y-weave ply 224 includes a consolidated ply 226 and two wing plies 228, and the wing plies include cuts 250 relatively orthogonal to the first platform 110 and the second platform 120 adjacent a forward end of the trailing edge noodle 222 such that portions of the Y-weave ply 224 behind the cuts 250 and adjacent the trailing edge noodle 222 extend through the first platform 110 and the second platform 120 (see, e.g., FIG. 5B).

An embodiment of method 900 may further include blending the wing plies 228 forward of the cuts 250 from a surface of the airfoil portion 130 into a surface of the first platform 110 and a surface of the second platform 120.

Another embodiment of method 900 may further include blending a surface of the airfoil portion 130 behind the cuts 250 (i.e., on trailing edge side) into a surface of the first platform 110 with a first cap ply 310, and blending a surface of the airfoil portion 130 behind the cuts 250 into a surface of the second platform 120 with a second cap ply 320.

One or more embodiments may further include notching (i.e., cutting or otherwise providing a notch 330 into) each of the first cap ply 310 and second cap ply 320 for passage of the consolidated ply 226 of the Y-weave ply 224.

Embodiments may further include trimming the consolidated ply 226 of the Y-weave ply 224 to have a curvature matching a blending curvature of the first and second cap ply 310, 320 prior to densification in order to avoid post-densification machining. For similar reasons, embodiments my include trimming the consolidated ply 226 of the Y-weave ply 224 to form the trailing edge 134 of the airfoil portion 130 prior to densification.

Further embodiments in accordance with the present disclosure are drawn to a CMC vane 100 layup. The CMC vane 100 layup includes a first platform 110 layup formed of a plurality of first donut plies, and a second platform 120 layup formed of a plurality of second donut plies. An airfoil portion 130 layup extends between the first platform 110 layup and the second platform 120 layup.

The airfoil portion 130 layup includes a first portion 210 of a shear tube 200 formed of fabric plies wrapped around a mandrel (not shown). The first portion 210 of the shear tube 200 extends relatively orthogonal to the first platform 110 layup and the second platform 110 layup, wherein the first portion 210 of the shear tube 200 extends through the first platform 110 layup and the second platform 120 layup, and wherein the first portion 210 of the shear tube 200 defines a leading edge 132 of the airfoil portion 130 layup.

An adjacent second portion 220 of the shear tube 200 is connected to the first portion 210 of shear tube 200 and extends relatively orthogonal to the first platform 110 layup and the second platform 120 layup. The second portion 220 of the shear tube 200 also extends through the first platform 110 layup and the second platform 120 layup.

The second portion 220 of the shear tube 200 includes a Y-weave ply 224 overwrap and a trailing edge noodle 222 that define a trailing edge 134 of the airfoil portion 130 layup. The Y-weave ply 224 includes a consolidated ply 226 and two wing plies 228, and the wing plies 228 include cuts 250 disposed relatively orthogonal to the first platform 110 layup and the second platform 120 layup adjacent a forward end of the trailing edge noodle 222 such that portions of the Y-weave ply 224 behind the cuts 250 and adjacent the trailing edge noodle 222 extend through the first platform 110 layup and the second platform 120 layup.

In an embodiment of the CMC vane 100 layup, the wing plies 228 forward of the cuts 250 may be blended from a surface of the airfoil portion 130 layup into a surface of the first platform 110 layup and a surface of the second platform 120 layup. The CMC vane 100 layup may further include a first cap ply 310 blending a surface of the airfoil portion 130 layup behind the cuts 250 into a surface of the first platform 110 layup and a second cap ply 320 blending a surface of the airfoil portion 130 layup behind the cuts 250 into a surface of the second platform 120 layup.

In a further embodiment of the CMC vane 100 layup, each of the first cap ply 310 and second cap ply 320 may include a notch 330 for passage of the consolidated ply 226 of the Y-weave ply 224. The consolidated ply 226 of the Y-weave ply 224 may then be trimmed to have a curvature matching a blending curvature of the first and second cap ply 310, 320, and the wing plies 228 may be wrapped around the leading edge 132.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A ceramic matrix composite (CMC) vane, comprising:
   a first platform;
   a second platform; and
   an airfoil portion extending between the first platform and the second platform, the airfoil portion including:
      a first portion of a shear tube extending relatively orthogonal to the first platform and the second platform, wherein the first portion of the shear tube extends through the first platform and through the second platform, and wherein the first portion of the shear tube defines a leading edge and a hollow core of the airfoil portion; and
      a second portion of the shear tube connected to the first portion of shear tube and extending relatively orthogonal to the first platform and the second platform, wherein the second portion of the shear tube also extends through the first platform and through the second platform, and wherein the second portion of the shear tube includes a Y-weave ply and a trailing edge noodle that define a trailing edge of the airfoil portion,
   wherein the Y-weave ply includes a consolidated ply and two wing plies, and the wing plies include cuts relatively orthogonal to the first platform and the second platform adjacent a forward end of the trailing edge noodle such that portions of the Y-weave ply behind the cuts and adjacent the trailing edge noodle extend through the first platform and the second platform, and
   the CMC vane further comprising a first cap ply blending a surface of the airfoil portion behind the cuts into a surface of the first platform and a second cap ply blending a surface of the airfoil portion behind the cuts into a surface of the second platform.

2. The CMC vane of claim 1, wherein the wing plies forward of the cuts are blended from a surface of the airfoil portion into a surface of the first platform and a surface of the second platform.

3. The CMC vane of claim 1, wherein each of the first cap ply and second cap ply includes a notch for passage of the consolidated ply of the Y-weave ply.

4. The CMC vane of claim 3, wherein the consolidated ply of the Y-weave ply is trimmed to have a curvature matching a blending curvature of the first and second cap ply prior to densification.

5. The CMC vane of claim 4, wherein the consolidated ply of the Y-weave ply is trimmed to form the trailing edge of the airfoil portion prior to densification.

6. The CMC vane of claim 5, wherein the Y-weave ply and the first and second cap ply form the overwrap plies of the airfoil portion and adjacent surfaces of the first and second platforms.

7. The CMC vane of claim 1, wherein the consolidated ply of the Y-weave ply extends further rearward while passing through the first and second platforms than portions of the consolidated ply forming the trailing edge of the airfoil portion.

8. The CMC vane of claim 1, wherein the wing plies wrap around the leading edge of the airfoil portion.

9. A method of forming a ceramic matrix composite (CMC) vane, comprising:
   forming an airfoil portion having a shear tube by:
      applying layers of fabric ply to a mandrel to form a first portion of the shear tube, wherein the first portion of the shear tube defines a leading edge portion and a hollow core of the airfoil portion; and
      forming a trailing edge noodle on the first portion of shear tube opposite the leading edge portion and overwrapping a Y-weave ply to form a second portion of the shear tube defining a trailing edge portion of the airfoil portion;
   forming a first platform at a first end of the shear tube with first donut plies such that the shear tube extends through the first platform;

forming a second platform at a second end of the shear tube with second donut plies such that the shear tube extends through the second platform; and applying an overwrap ply to surfaces of at least a portion of each of the first platform, the second platform, and airfoil portion CMC vane, wherein the Y-weave ply includes a consolidated ply and two wing plies, and further comprising cutting the wing plies relatively orthogonal to the first platform and the second platform adjacent a forward end of the trailing edge noodle such that portions of the Y-weave ply behind the cuts and adjacent the trailing edge noodle extend through the first platform and the second platform, and the method further comprising blending a surface of the airfoil portion behind the cuts into a surface of the first platform with a first cap ply; and blending a surface of the airfoil portion behind the cuts into a surface of the second platform with a second cap ply.

10. The method of claim 9, further comprising blending the wing plies forward of the cuts from a surface of the airfoil portion into a surface of the first platform and a surface of the second platform.

11. The method of claim 9, further comprising notching each of the first cap ply and second cap ply for passage of the consolidated ply of the Y-weave ply.

12. The method of claim 11, further comprising trimming the consolidated ply of the Y-weave ply to have a curvature matching a blending curvature of the first and second cap ply prior to densification.

13. The method of claim 12, further comprising trimming the consolidated ply of the Y-weave ply to form the trailing edge of the airfoil portion prior to densification.

14. A ceramic matrix composite (CMC) vane layup, comprising:
   a first platform layup formed of a plurality of first donut plies;
   a second platform layup formed of a plurality of second donut plies; and
   an airfoil portion layup extending between the first platform and the second platform, the airfoil portion layup including:
      a first portion of a shear tube formed of fabric plies wrapped around a mandrel, the first portion of a shear tube extending relatively orthogonal to the first platform layup and the second platform layup, wherein the first portion of the shear tube extends through the first platform layup and the second platform layup, and wherein the first portion of the shear tube defines leading edge; and
      a second portion of a shear tube connected to the first portion of shear tube and extending relatively orthogonal to the first platform layup and the second platform layup, wherein:
   the second portion of the shear tube also extends through the first platform layup and the second platform layup,
   the second portion of the shear tube includes a Y-weave ply overwrap and a trailing edge noodle that define a trailing edge of the airfoil portion layup, and
   the Y-weave ply includes a consolidated ply and two wing plies, and the wing plies include cuts relatively orthogonal to the first platform layup and the second platform layup adjacent a forward end of the trailing edge noodle such that portions of the Y-weave ply behind the cuts and adjacent the trailing edge noodle extend through the first platform layup and the second platform layup,
wherein the wing plies forward of the cuts are blended from a surface of the airfoil portion layup into a surface of the first platform layup and a surface of the second platform layup, and the CMC vane layup further including a first cap ply blending a surface of the airfoil portion layup behind the cuts into a surface of the first platform layup and a second cap ply blending a surface of the airfoil portion layup behind the cuts into a surface of the second platform layup.

15. The CMC vane layup of claim 14, wherein:
each of the first cap ply and second cap ply includes a notch for passage of the consolidated ply of the Y-weave ply,
the consolidated ply of the Y-weave ply is trimmed to have a curvature matching a blending curvature of the first and second cap ply, and
the wing plies wrap around the leading edge.

* * * * *